(12) United States Patent
Jensen et al.

(10) Patent No.: US 6,238,110 B1
(45) Date of Patent: May 29, 2001

(54) APPARATUS AND A METHOD FOR PREPARING A PROCESSING BATH, A MANIFOLD, AND A USE OF A MANIFOLD

(75) Inventors: Tommy Jensen, Roskilde; Jens Havn Thorup, Copenhagen; Henrik Wegge, Ringsted, all of (DK)

(73) Assignee: Glunz & Jensen A/S, Ringsted (DK)

( * ) Notice: Subject to any disclaimer, the term of this patent is extended or adjusted under 35 U.S.C. 154(b) by 0 days.

(21) Appl. No.: 09/594,258

(22) Filed: Jun. 15, 2000

Related U.S. Application Data

(63) Continuation-in-part of application No. PCT/DK98/00562, filed on Dec. 17, 1996, now abandoned.

(30) Foreign Application Priority Data

Dec. 17, 1997 (DK) .................................................. 01478/97

(51) Int. Cl.[7] ...................................................... G03D 3/02
(52) U.S. Cl. ........................ 396/626; 210/304; 210/312; 366/144; 366/171.3; 96/210
(58) Field of Search ................................. 396/576, 626; 366/144, 165.3, 171.1; 96/175, 212, 210, 216, 413; 210/304, 312

(56) References Cited

U.S. PATENT DOCUMENTS

| | | |
|---|---|---|
| 3,044,236 | 7/1962 | Bearden et al. . |
| 3,771,290 | 11/1973 | Stethem . |
| 4,190,617 | 2/1980 | Hope et al. . |
| 5,203,891 | 4/1993 | Lema . |
| 5,309,191 | 5/1994 | Bartell et al. . |
| 5,622,545 | 4/1997 | Mazzei et al. . |

FOREIGN PATENT DOCUMENTS

| | | |
|---|---|---|
| 35 09 007 | 9/1985 | (DE) . |
| 0 555 162 | 8/1993 | (EP) . |

*Primary Examiner*—D. Rutledge
(74) *Attorney, Agent, or Firm*—Thomas R. Vigil

(57) ABSTRACT

An apparatus for the preparation of a bath (15) for processing photographic material comprises a tank (14) adapted for holding the bath, a container (18) for holding a feedstock fluid and a separator (1) in fluid communication with the container to receive feedstock fluid from the container. The separator comprises a fluid inlet port (2), a liquid outlet (4), a vent opening (3) and means adapted for separating liquid and gas by a cyclone action. The separator provides a manifold for merging inlet flow connections from several containers. The invention provides an apparatus, a method, a manifold, and a use of a manifold.

21 Claims, 3 Drawing Sheets

APPARATUS AND A METHOD FOR PREPARING A PROCESSING BATH, A MANIFOLD, AND A USE OF A MANIFOLD

CROSS-REFERENCE TO RELATED APPLICATIONS

This is a continuation-in-part of International Patent Application PCT/DK98/00562 with an international filing date of Dec. 17, 1998, now abandoned. This application is based on application No. 01478/97 filed in Denmark on Dec. 17, 1997, the contents of which are incorporated hereinto by reference.

BACKGROUND OF THE INVENTION

1. Field of the invention

The present invention relates to the field of preparing baths for the processing of photographic materials. The invention further relates to a manifold adapted for separating liquid and gas. The invention still further relates to a use of the manifold for preparing a processing bath.

The invention addresses the field of preparing or replenishing baths of liquids in applications, where there is a need to avoid gas bubbles and foam in the bath, and where there is a desire to minimize agitation of the body of liquid held in the bath. Such concerns arise in applications with liquids prone to enter undesired reactions with air, where air locks may form, and/or where agitation in the liquid may give rise to uncontrolled variations in the processing conditions. These considerations may have particular importance in connection with liquids containing surfactants that enhance their propensity to form foam and bubbles.

One field of application, where these considerations apply, is the field of baths for photographic processing.

The processing solutions or development liquids used are in many cases highly reactive and very likely to react with substances in the air, e.g. with oxygen. The development liquids may also comprise tensides or other surfactants including them to foam formation. The surfactants are important for furthering desirable properties of the processing solutions, e.g. for making the liquids effective towards dissolving and stripping off non-exposed areas of emulsion within a photographic piece of material.

However, surfactants make processing solutions susceptible to foam formation on pumping and agitation, as may occur during replenishment of the tank. The foam may clog vents and pipes and may cause spill over. Problems with excessive foam formation may lead to the decision to avoid the surfactants, thus forgoing their desirable capabilities in other aspects.

2. Description of the Prior Art

U.S. Pat. No. 5,309,191 describes an apparatus adapted for replenishment and flushing of a tank which forms part of a photographic processing apparatus. The apparatus comprises replenishment tanks, a manifold, a pump, and valves for permitting controlled introduction of processing solution into a tank. The inlet for the processing solution is at the bottom of the tank with the view to avoid air from being entrapped in the processing apparatus.

Feeding in liquid at the bottom of the tank requires the establishment of a fluid conduit, which is inherently open to undesirable backflow into the feed piping, e.g. during time intervals when the feed pump is stopped. The risk of backflow may be encountered, e.g. by the installation of active means, such as check valves.

However, for considerations of safety and reliability it would be preferred to have a system where the prevention of backflow would not need to rely on the performance of active means.

Feeding in liquids through a manifold placed below the liquid surface level makes it complicated to maintain complete separation between different ingredients intended to be mixed in the bath. This is a concern since the ingredients, when in a concentrated state, may be susceptible to enter undesirable reactions among them, e.g. to form gel. Feeding in liquid at the lower portion of the tank does not completely avoid the risk of introducing air bubbles since the feed pipe may occasionally suck in air, e.g. during a phase when the replenishment tank is being emptied.

U.S. Pat. No. 5,622,545 discloses a separator for removing gases from water for the purpose of treating water for fish aqua cultures. The separator comprises a vortex tube wherein water is injected to spin downwardly while gas may exit the separator through a gas exit port at the top.

U.S. Pat. No. 3,044,236 discloses a system for removal of gases from liquids in order to prepare gas-free samples from chemical process streams prior to their analyses. The system comprises a gas disengager, wherein a gas-liquid mixture is introduced tangentially with the purpose of stripping away any gas. A weir serves to limit variations in hydrostatic head.

SUMMARY OF THE INVENTION

The invention in a first aspect provides an apparatus for the preparation of a bath for processing photographic material, comprising a tank adapted for holding the bath, a container for holding a feedstock fluid and a separator in fluid communication with said container by first fluid conduit means and in fluid communication with said tank by second fluid conduit means, said separator comprising a fluid inlet port communicated with said first fluid conduit means, a liquid outlet communicated with said second fluid conduit, a vent opening, means for skimming excess foam away from said separator and flow diversion means adapted for engaging a stream of feedstock fluid introduced through said inlet port and for guiding the stream along a curved path in order to separate the fluid into gas and liquid by a cyclone action and for conveying the liquid through a laminar flow regimen into a collection region, communicated to said liquid outlet.

This apparatus receives a feedstock fluid from a container, strips away any gas from the fluid, and guides the liquid to a collection region, from which the liquid discharges in such way that it may be introduced into the bath with a minimal agitation. The gas escapes the separator through the vent opening. The liquid introduced into the bath holds a minimal content of gas, and it is introduced with minimal pouring of the bath. The separation of gas from the liquid is achieved by a cyclone action. The cyclone action enhances separation of gas and liquid according to their differential specific gravities.

The separator effectively performs a three-way separation function; discharging gas through the vent opening, foam through the drain, and liquid through the liquid outlet. This apparatus is effective in the handling of highly surface-active fluids.

Preferably, the cyclone action involves the forming of a laminar flow regimen in a thin layer of fluid in contact with a peripheral wall surface. The thin layer of fluid shortens the distance any air bubbles need to cover in order to escape the liquid. The laminar flow involves a flow regimen where the velocity is lower near the wall surface and higher away from the wall surface, i.e. towards the axis of the cyclone. The differential velocities give rise to a dynamic pressure gradient, which furthers separation of gas and liquid. The collection region allows the liquid to settle, while permitting any gas bubbles to escape.

The vortex motion may be imparted by active means, e.g. by propellers, blades or rotating chambers active to impart a body of fluid a rotating motion. However, according to a preferred embodiment, the vortex motion is achieved by guiding the stream of fluid entering the separator through the inlet port and along a tangential direction towards the inside of a curved wall, thus utilizing the momentum of the stream of fluid so as to create a vortex motion.

According to a preferred embodiment, a weir, preferably associated with a drain, communicated to a receptacle, controls the level of liquid in the separator. The weir is effective to cap excess build-up of foam inside the separator so as to avoid any possibility of foam rising to clog the vent opening. On the other hand, the weir may be situated at a level above the inlet ports, as the foam has been found to cause no problems with the inlets. Any foam held in the separator below the level of the weir and above the surface of liquid is allowed to settle down.

According to a preferred embodiment, the apparatus is associated with means for keeping the level of liquid below a maximum level, which is below the level of the inlet port. This avoids any risk of liquid flowing backwards through the inlet port. The means for controlling the level of liquid may comprise passive means, such as an overflow or a weir, or they may comprise active means, such as a level sensor associated with means for controlling the rate of intake and/or discharge of fluid from the separator and/or tank.

According to a preferred embodiment, the separator comprises two separate inlet ports, preferably associated with respective containers for holding respective feedstocks of fluids. Thus the separator also provides a manifold for merging feed flows from different sources of replenishment solutions. As the inlet ports are above the maximum liquid level, there is no possibility of the replenishment solutions becoming intermixed in the feed conduits.

The invention in a further aspect provides a method for preparing a bath for the processing of photographic material, comprising feeding a feedstock fluid from a container in a stream and into a separator, skimming any excess foam away from the stream of fluid inside said separator and guiding the stream of fluid inside said separator along a curved path in order to strip any gas or foam from the fluid by a cyclone action and leave a residue of liquid, conveying the liquid through a laminar flow regimen into a collection region, and discharging the liquid from there through fluid conduit means into said tank so as to prepare the bath.

This method is very effective in preparing a bath for the processing of photographic material in that liquid is communicated to the bath free from air bubbles and with a minimum of pouring or agitation of the liquid in the bath. This method is effective in handling surface-active liquids, such as photographic chemicals.

Preferred embodiments are provided by the method subclaims.

The invention in a third aspect provides a manifold comprising at least two inlet ports, a liquid outlet, a vent opening and flow diversion means adapted for engaging a stream of fluid introduced through one of said inlet ports and for guiding the stream along a curved path in order to separate the fluid into gas and liquid by a cyclone action and for conveying the liquid through a laminar flow regimen into a collection region communicated to said liquid outlet, wherein said inlet ports are mutually spaced and arranged to minimize the likelihood that liquid introduced through any one of said inlet ports could accidentally splash into any other one of said inlet ports.

This manifold is effective in merging feed conduits while avoiding any risk of backflow or intermixing of fluids in the feed conduits. The manifold also provides a separation function so as to discharge liquid which is stripped off of any gas or foam.

Preferred embodiments of the manifold are indicated in respective subclaims.

The invention in a fourth aspect provides a use of a manifold comprising at least two inlet ports, a liquid outlet, a vent opening and flow diversion means adapted for engaging a stream of fluid introduced through one of said inlet ports and for guiding the stream along a curved path in order to separate the fluid into gas and liquid by a cyclone action and for conveying the liquid through a laminar flow regimen into a collection region communicated to said liquid outlet, wherein said inlet ports are mutually spaced and arranged to minimize the likelihood that liquid introduced through any one of said inlet ports could accidentally splash into any other one of said inlet ports, for the purpose of preparing a bath for the processing of photographic material, the use comprising feeding successive portions of feedstock fluids from respective containers through said inlet ports, separating each of the portions of feedstock fluids into respective gas and liquid fractions and communicating the liquid fractions through said liquid outlet into said tank so as to prepare the bath.

This use is effective towards preparing a processing bath including ingredients from separate feedstock containers, all of which ingredients are handled and introduced into the bath with minimal risk of introducing air bubbles or of causing foaming as well as with minimal risk of intermixing ingredients in the feed conduits.

BRIEF DESCRIPTION OF THE DRAWINGS

Further features and advantages of the invention will appear from the description of preferred embodiments presented below with reference to the appended drawings wherein.

BEST MODE FOR CARRYING OUT THE INVENTION

All figures are schematic and not necessarily to scale and illustrate only those parts which are essential in order to enable those skilled in the art to understand and practice the invention, whereas other parts are omitted from the drawings for the sake of clarity.

Throughout the drawings identical references have been used to designate identical or similar items.

Figure 1:
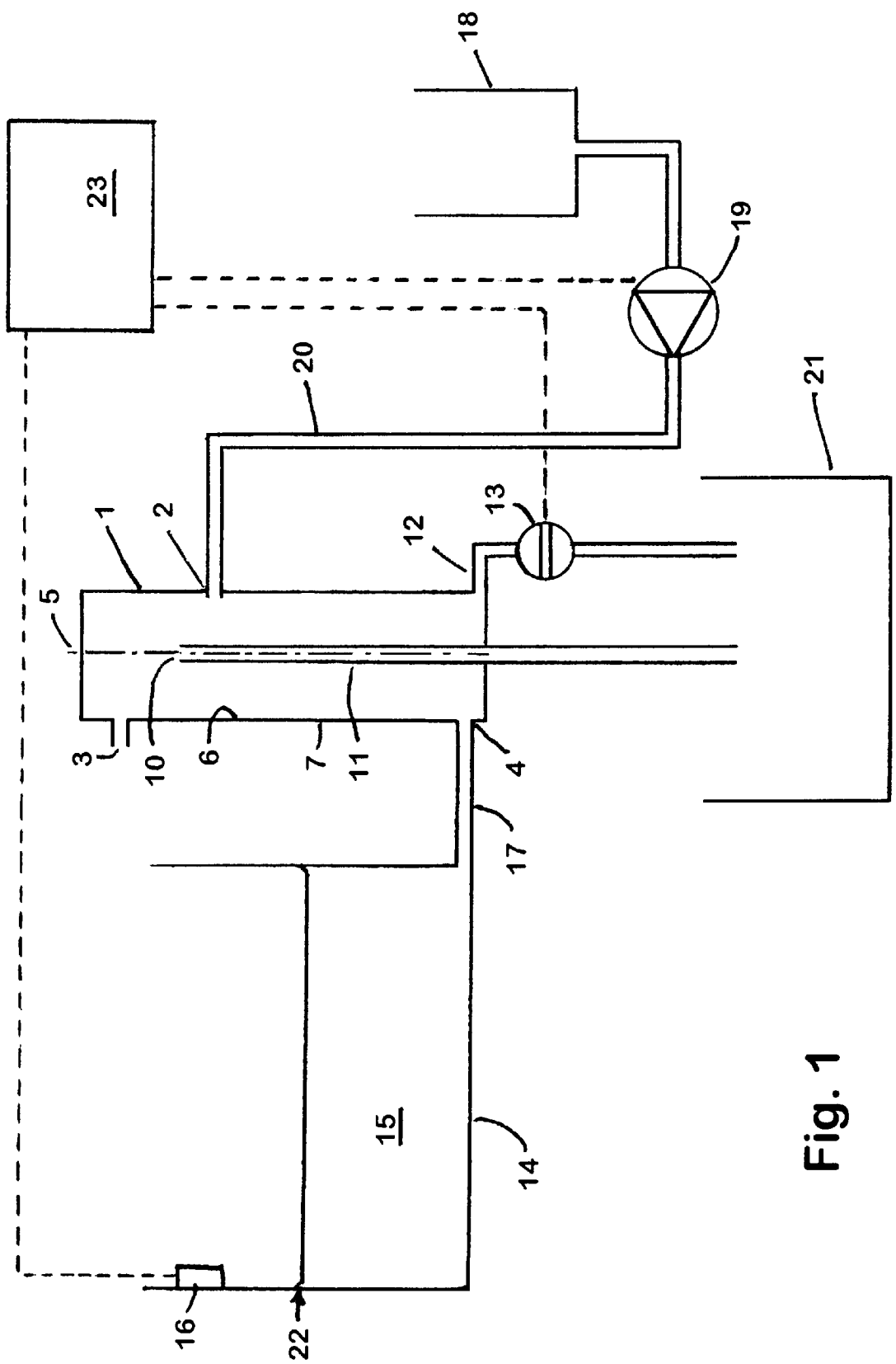
FIG. 1 illustrates a schematic diagram of a system including an apparatus according to one aspect of the invention.

Reference is first made to FIG. 1 for a description of a system, wherein an apparatus according to the invention is used.

The system comprises a tank or a vat 14 adapted for holding a bath of liquid 15 and provided with a level sensor 16 adapted for continually sensing the level of liquid. The level sensor comprises means suitable for sensing a level of liquid as may be suggested by those skilled in the art, and it is connected to transmit a sensor signal to a controller 23. The tank 14 is provided with various accessories and equipment known in the art and not shown in the drawing, such as agitation means, temperature sensors, means for guiding photographic material through the bath for treatment, etc.

To the right, FIG. 1 illustrates a container 18 adapted for holding a feedstock of solution available for being selectively introduced into the tank, e.g. with the purpose of preparing a completely new liquid bath, or with the purpose of replenishing or regenerating the liquid in the bath. Liquid may discharge from the container 18 through a feed line 20, which comprises a pump 19 controlled by the controller 23 and adapted for boosting the flow of liquid in order that a flow of liquid may be provided as desired. The feed line feeds into a separator 1. The separator 1 comprises a hollow body or trough, which receives the feed liquid and performs the function of separating fractions of liquid and gas in a way to be explained later on.

To the bottom left, the separator 1 comprises an outlet line 17 connected to the bottom portion of the tank 14 in order that liquid may transfer to the tank 14.

The separator 1 is at the top provided with a vent opening 3, by which the gas fraction may discharge. Somewhat below the vent opening, the separator comprises an overflow port 10 communicated by way of an overflow pipe 11 to a receptacle 21. The overflow pipe is adapted for draining any excess liquid or foam to the receptacle 21.

On occasions when liquid or foam discharges through the overflow pipe, the vent opening 3 admits air into the separator, thereby preventing surges of liquid or foam discharge along the overflow pipe from causing a vacuum inside the separator. During normal operation, intake and discharge of liquid will generally be balanced in order to keep the level of liquid to stay below a maximum level indicated by an arrow 22 at the tank, as shown to the left in FIG. 1. This maximum level 22 is situated below the level of the overflow port 10 and also below the level, where the feed line 20 enters the separator 1.

To the bottom right, the separator 1 is provided with a drain conduit 12 with a drain valve 13 controlled from the controller 23 and adapted to selectively discharge liquid to the receptacle 21.

The pump 19 in the preferred embodiment comprises a bellows pump with check valves. Other embodiments may comprise any other type of pump suitable for driving and controlling the flow of fluid as appropriate. Still other embodiments rely on the force of gravity, in which case the container 18 will be arranged at an elevated position relative to the separator 1, and the pump 19 is replaced with a control valve in order to permit selective transfer of liquid.

Figure 3:
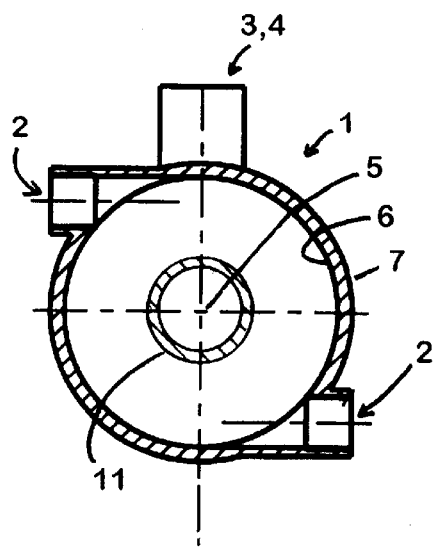
FIG. 3 illustrates a section of the separator by a plane perpendicular to the separator axis.
Figure 2:
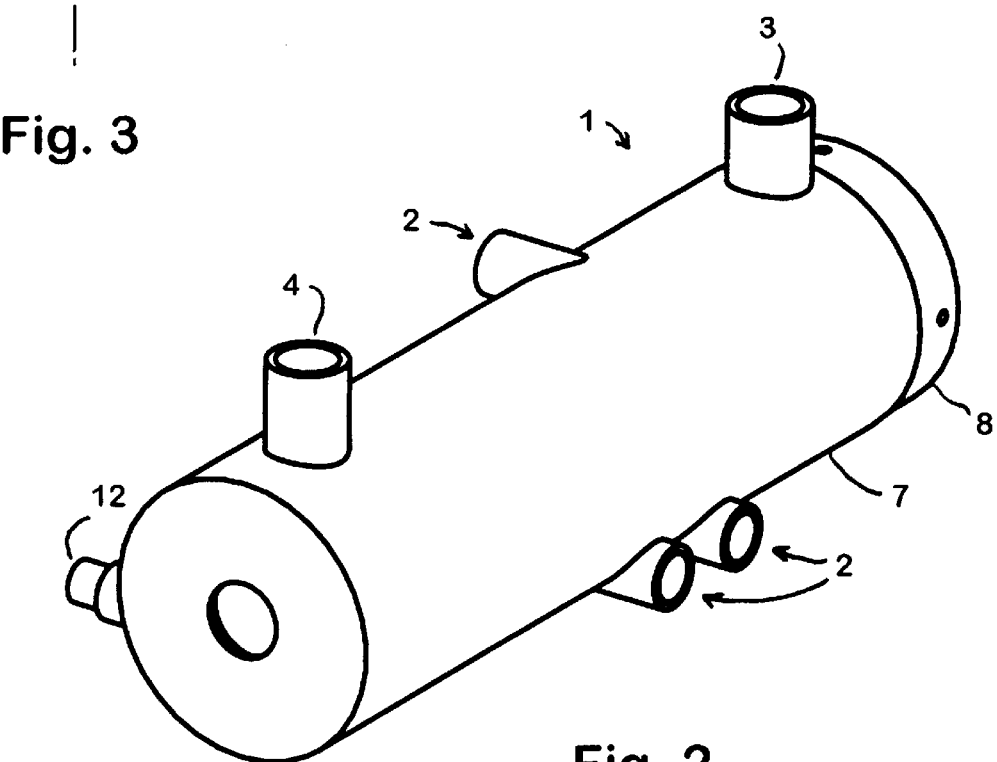
FIG. 2 is an isometric view of a separator used in the apparatus according to a second aspect of the invention.
Figure 4:
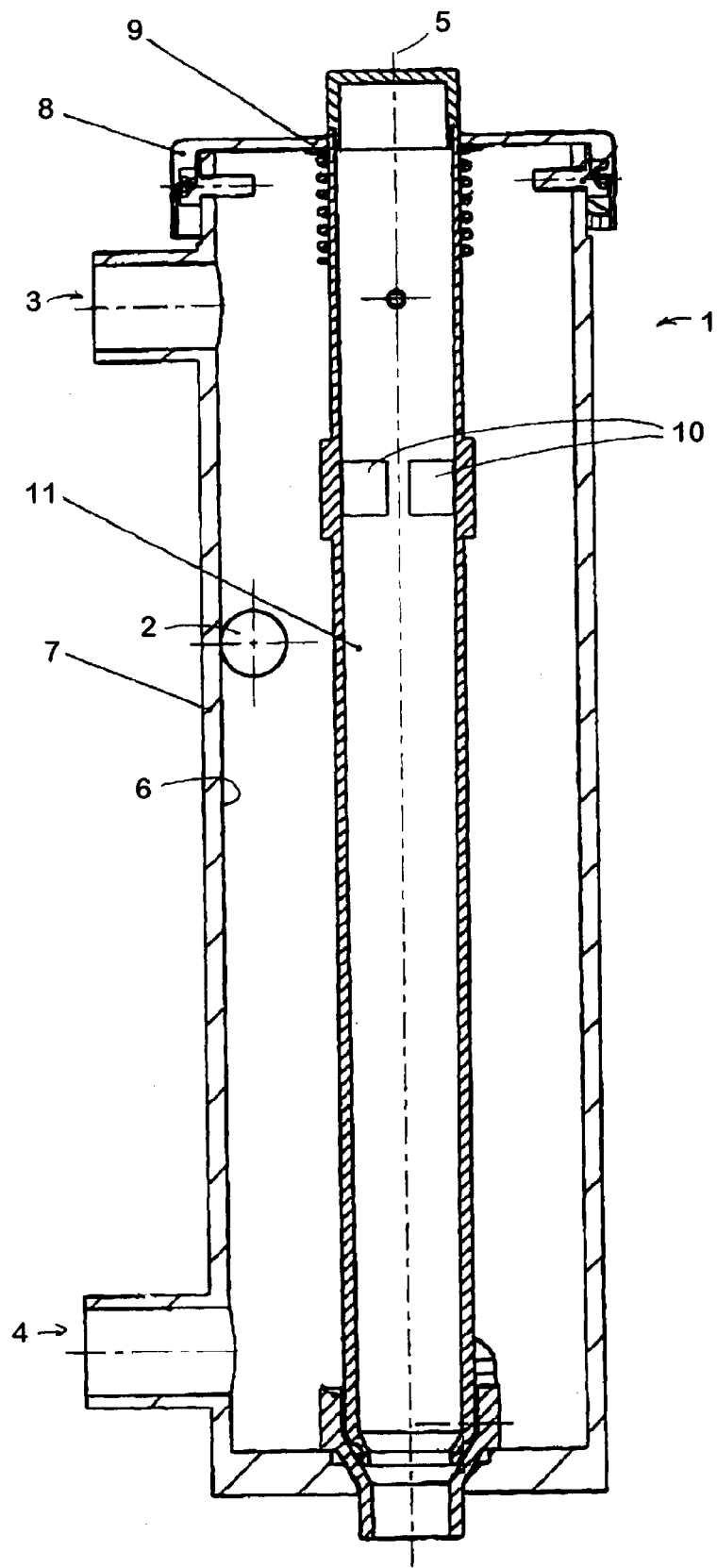
FIG. 4 illustrates a section in the separator by a plane that includes the separator axis.

Reference is now made to FIGS. 2, 3, and 4 for a more detailed description of the separator 1 used according to the invention. The separator comprises a generally cylindrical, hollow body comprising a housing 7 and a lid 8. The housing 7 generally provides an interior essentially circular, cylindrical wall surface 6 symmetrical about an axis 5 and a generally planar bottom wall.

The housing is provided with an internal axial pipe extending from the top to the bottom and registered at the lower end with a flared aperture in the housing bottom from which it is communicated by suitable piping (refer FIG. 1) towards the receptacle, as explained above. The axial pipe, which provides the overflow pipe 11, is retained inside the housing by a spring 9 reacting against the lid and biasing the pipe downwardly. The lower end of the pipe is tapered and registered by engagement in the flared aperture in the housing bottom wall.

The housing, the lid, and the tube section may all be manufactured by molding of plastics, e.g. polyvinyl chloride. A housing with an inner diameter of 82 mm, a height of 300 mm, and a wall thickness of 4 mm has been found to perform well.

The overflow pipe 11 comprises recesses in the pipe wall providing in effect overflow ports 10, as illustrated in FIG. 4. The housing comprises three inlet ports 2 which are oriented generally tangentially to the housing. The three inlet ports provide for the connection of different feed lines (refer FIGS. 2 and 3) in order that the vortex tube 1 also provides a manifold for merging feed lines from three separate feedstock containers. The three inlet ports are mutually spaced, all placed below the level of the overflow ports 10 and all placed to guide the respective liquid feeds in the same rotational sense about the separator axis. This arrangement minimizes the likelihood that liquid introduced through anyone of the three inlet ports could accidentally splash into another one of the inlet ports.

Further, at a level above the overflow ports, the separator comprises a vent opening 3 in the form of a radial pipe stub projecting to the left in FIG. 4. Near the bottom, the separator comprises an outlet port 4, through which liquid may discharge to be communicated to the tank, as explained above. The outlet port 4 comprises a pipe stub generally similar to and parallel to the vent pipe 3 in order that the two pipe stubs provide suitable means for mechanical fastening of the separator. Near the bottom, the separator 1 comprises a drain conduit 12 fitted with a drain valve 13 (refer to FIGS. 1 and 2) in order to provide a drain for selective emptying of the separator.

During use, when need arises for introducing liquid into the tank 14, the controller 23 activates the pump 19 to suck solution from the container 18 through the feed line 20 into the inlet port 2 associated with the respective container. The liquid entering the inlet port may at this stage comprise air bubbles or gas bubbles and may therefore more properly be referred to as a fluid. The pump 19 drives this fluid in a flow to enter the inlet port 2, which provides a nozzle for injecting a stream of fluid into the separator housing. By its momentum the stream of fluid impinges on the inside wall 6 in a tangential fashion. The inner wall 6 diverges the stream into a rotational pattern.

As the force of gravity also affects the liquid, the flow will generally spin or spiral downwardly in a helical motion pattern along the housing inside peripheral wall 6. This spreads out the stream of fluid into a thin layer in contact with the wall 6. The centrifugal action on the spinning body of fluid dynamically separates gas and foam from the liquid according to the differential specific gravities in order that the foam and gas move towards the vortex tube axis.

The liquid flowing along the wall moves in a laminar flow regimen, wherein liquid in layers adjacent the wall move slower, whereas liquid in layers more remote from the wall moves faster. The radial gradient of flow velocities give rise to a dynamic pressure gradient, which enhances the separation effect, caused by the centrifugal forces.

The liquid continues in a vortex flow pattern until it is collected in the lower portion of the housing, where it meets the surface of liquid collected above the bottom of the housing, whereby it settles. Liquid discharges from the separator through the outlet line 17 to enter the tank 14 until the surface levels are even.

In this way the replenishment liquid is merged into the body of liquid held in the tank with a minimal agitation and minimal puddling of liquid. The flow from the container and into the body of liquid in the tank is smooth and with no acute bends and with minimal formation of foam. The separator will perform its function properly, even in case of surges or pulsations in the flow, as may arise e.g. due to trapped volumes of air, pump pulsations, hammering on start or stop, etc.

Should any excess of foam develop inside the separator, the level of foam will gradually build up until it meets the overflow ports 10, which ports will then skim any further excess of foam to discharge it to the receptacle. This avoids the risk of foam clogging up the vent opening.

Should need arise for reducing the content of liquid held in the tank 14, the controller 23 manipulates the drain valve 13 to "open" position, and the liquid drains backwards from the tank through the outlet line 17, through the separator 1 and the drain conduit 12 to be collected in the receptacle 21.

The apparatus according to the preferred embodiment has been tested with highly surface active processing solutions, and it has proved apt for handling such fluids very effectively, stripping off any foam or air bubbles from the fluid and transferring liquids smoothly to the tank as appropriate.

Although specific embodiments have been described above it is emphasized that the invention may be exercised in several ways and that the explanation given above exclusively serves to clarify the invention and not to limit the scope of protection conferred, which is exclusively defined by the appended claims.

We claim:

1. An apparatus for the preparation of a bath for processing photographic material, comprising a tank adapted for holding the bath, a container for holding a feedstock fluid and a separator in fluid communication with said container by first fluid conduit means and in fluid communication with said tank by second fluid conduit means, said separator comprising a fluid inlet port communicated with said first fluid conduit means, a liquid outlet communicated with said second fluid conduit, a vent opening, means for skimming excess foam away from said separator and flow diversion means adapted for engaging a stream of feedstock fluid introduced through said inlet port and for guiding the stream along a curved path in order to separate the fluid into gas and liquid by a cyclone action and for conveying the liquid through a laminar flow regimen into a collection region, communicated to said liquid outlet.

2. The apparatus according to claim 1, wherein said flow diversion means comprises a curved wall, and wherein said fluid inlet port is adapted to guide the stream of fluid entering said separator in a direction tangentially to said curved wall in order to create a vortex of fluid inside said separator.

3. The apparatus according to claim 1, wherein said separator is adapted to further separation of gas and liquid by a filming action.

4. The apparatus according to claim 1, wherein said separator is adapted to further separation of gas and liquid according to their differential specific gravities by settling.

5. The apparatus according to claim 1, comprising level control means adapted for keeping the level of liquid below said vent opening.

6. The apparatus according to claim 1, comprising a receptacle and means for draining excess foam away from said separator and to said receptacle.

7. The apparatus according to claim 1, and comprising means for keeping the level of liquid within said separator within a maximum level, which is below the level of said inlet port in order to prevent any backflow of liquid through said inlet port.

8. The apparatus according to claim 7, wherein said separator comprises at least two separate inlet ports, both arranged above the maximum level.

9. The apparatus according to claim 8, and comprising at least two separate containers for holding respective feedstocks of fluids and means for controlled introduction of fluids from said containers through respective inlet ports.

10. A method for preparing a bath for the processing of photographic material, comprising feeding a feedstock fluid from a container in a stream and into a separator, skimming any excess foam away from the stream of fluid inside said separator and guiding the stream of fluid inside said separator along a curved path in order to strip any gas or foam from the fluid by a cyclone action and leave a residue of liquid, conveying the liquid through a laminar flow regimen into a collection region, and discharging the liquid from there through fluid conduit means into said tank so as to prepare the bath.

11. The method according to claim 10, comprising draining any excess foam off from said separator and into a receptacle.

12. The method according to claim 10, comprising controlling the level of liquid inside said tank to maintain a predetermined level and entering the discharged liquid at a portion of said tank below said predetermined level so as to minimize pouring of liquid inside said tank.

13. The method according to claim 10, comprising controlling the level of liquid inside said separator so as to stay below a predetermined level, while introducing feedstock fluid into said separator at a level above the maximum level in order to prevent any siphoning of liquid into said container.

14. A manifold comprising at least two inlet ports, a liquid outlet, a vent opening and flow diversion means adapted for engaging a stream of fluid introduced through one of said inlet ports and for guiding the stream along a curved path in order to separate the fluid into gas and liquid by a cyclone action and for conveying the liquid through a laminar flow regimen into a collection region communicated to said liquid outlet, wherein said inlet ports are mutually spaced and arranged to minimize the likelihood that liquid introduced through any one of said inlet ports could accidentally splash into any other one of said inlet ports.

15. The manifold according to claim 14, wherein said flow diversion means comprises a curved wall, and wherein at least one of said fluid inlet ports is adapted to guide the stream of fluid entering said manifold in a direction tangentially to said curved wall in order to create a vortex of fluid inside said manifold.

16. The manifold according to claim 14, and adapted to further separation of gas and liquid by a filming action.

17. The manifold according to claim 14, and adapted to further separation of gas and liquid according to their differential specific gravities by settling.

18. The manifold according to claim 14, and comprising level control means adapted for keeping the level of liquid within a maximum level, which is below the level of said inlet port in order to prevent any backflow of liquid through said inlet port.

19. The manifold according to claim 14, and comprising a weir for keeping the level of liquid below said vent opening.

20. The manifold according to claim 18, wherein said weir is associated with a drain adapted for draining excess foam away from said manifold and to a receptacle.

21. The use of a manifold comprising at least two inlet ports, a liquid outlet, a vent opening and flow diversion means adapted for engaging a stream of fluid introduced through one of said inlet ports and for guiding the stream along a curved path in order to separate the fluid into gas and liquid by a cyclone action and for conveying the liquid through a laminar flow regimen into a collection region communicated to said liquid outlet, wherein said inlet ports are mutually spaced and arranged to minimize the likelihood that liquid introduced through any one of said inlet ports could accidentally splash into any other one of said inlet ports for the purpose of preparing a bath for the processing of photographic material, the use comprising feeding successive portions of feedstock fluids from respective containers through said inlet ports, separating the respective portions of feedstock fluids into respective gas and liquid fractions and communicating the liquid fractions through said liquid outlet into said tank so as to prepare the bath.

\* \* \* \* \*